United States Patent
Shingai et al.

(10) Patent No.: US 6,403,193 B1
(45) Date of Patent: Jun. 11, 2002

(54) OPTICAL RECORDING MEDIUM

(75) Inventors: Hiroshi Shingai; Hideki Hirata; Tatsuya Kato, all of Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/531,446

(22) Filed: Mar. 20, 2000

(30) Foreign Application Priority Data

Mar. 19, 1999 (JP) ............................................ 11-076943

(51) Int. Cl.$^7$ ................................................. B32B 3/02

(52) U.S. Cl. .................... 428/64.1; 428/64.5; 428/64.6; 430/270.13

(58) Field of Search .............................. 428/64.1, 64.2, 428/64.4, 64.5, 64.6, 457, 913; 430/270.13, 495.1, 945; 369/283, 288

(56) References Cited

U.S. PATENT DOCUMENTS 6,033,752 A * 3/2000 Suzuki ........................ 428/64.1
6,071,588 A * 6/2000 Nobumasa .................. 428/64.4

FOREIGN PATENT DOCUMENTS

JP 63-57859 11/1988
JP 7-134838 5/1995

OTHER PUBLICATIONS

U.S. application No. 09/220,444, filed Dec. 24, 1998, Pending.
U.S. application No. 09/220,344, filed Dec. 24, 1998, Allowed.
U.S. application No. 09/531,457, filed Mar. 20, 2000, Pending.
U.S. application No. 09/531,449, filed Mar. 20, 2000, Pending.
U.S. application No. 09/619,317, filed Jul. 18, 2000, Pending.

* cited by examiner

Primary Examiner—Elizabeth Evans
(74) Attorney, Agent, or Firm—Oblon, Spivak, McClelland, Maier & Neustadt, P.C.

(57) ABSTRACT

An optical recording medium of the invention comprises a phase change type recording layer on a surface of a substrate with reading light incident on the recording layer through the substrate, and a dielectric layer provided in contact with the recording layer and on a side of the recording layer on which the reading light is incident. The substrate has a groove acting as a guide groove and a land between adjacent grooves so that the groove and land are used as recording tracks. The phase change type recording layer contains Ag, In, Sb and Te as main components, and has a thickness $t_R$ defined by $t_R \leq \lambda_p/20$ where $\lambda_p$ is a wavelength of the reading light. The dielectric layer has a thickness $t_{d1}$ that is represented in terms of an optical path length at the wavelength $\lambda_p$ and defined by $\lambda_p/2 \leq t_{d1}$.

3 Claims, 2 Drawing Sheets

RECORDING AND REPRODUCING LIGHT

RECORDING AND REPRODUCING LIGHT

RECORDING AND REPRODUCING LIGHT

OPTICAL RECORDING MEDIUM

BACKGROUND OF THE INVENTION

The present invention relates to a phase change type optical recording medium.

Highlight is recently focused on optical recording media capable of recording information at a high density and erasing the recorded information for rewriting. One typical rewritable optical recording medium is of the phase change type wherein the recording layer is irradiated with laser beam to change its crystallographic state whereupon a change of reflectance by the crystallographic change is detected for reading. Optical recording media of the phase change type can be overwritten by modulating the intensity of a single light beam, i.e., by modulating recording light in such a way that it has a plurality of power levels comprising a recording power level and an easing power level. In addition, the optical recording medium of the phase change type is simpler in terms of the optical system of the driving mechanism as compared with magneto-optical recording media.

Most optical recording media of the phase change type use chalcogenides such as Ge-Te and Ge-Sb-Te based materials which provide a substantial difference in reflectance between crystalline and amorphous states and have a relatively stable amorphous state. In recent years, it has also been proposed to use compounds known as chalcopyrites. Chalcopyrite compounds are extensively investigated as compound semiconductor materials, and applied to solar batteries and the like. The chalcopyrite compounds are composed of Ib-IIIb-VIb$_2$ or IIb-IVb-Vb$_2$ as expressed in terms of the Groups of the Periodic Table and have two stacked diamond structures. The structure of chalcopyrite compounds can be readily identified by X-ray structural analysis and their basic characteristics are described in Physics, Vol. 8, No. 8 (1987), page 441, Denki Kagaku (Electrochemistry), Vol. 56, No. 4 (1988), page 228, and other literature. Among the chalcopyrite compounds, AgInTe$_2$ is known to be applicable as a recording material by diluting it with Sb or Bi. The resulting optical recording media are generally operated at a linear velocity of about 7 m/s. See JP-A's 3-240590, 3-99884, 3-82593, 3-73384 and 4-151286. In addition to these phase change type optical recording media using chalcopyrite compounds, JP-A's 4-267192, 4-232779 and 6-166268 disclose a phase change type optical recording media wherein an AgSbTe$_2$ phase forms upon the crystallization of a recording layer.

In the phase change type optical recording medium, the substrate is provided with tracking grooves (guide grooves). In some cases, these grooves may carry address information thereon. So far, it has been common to form recording marks within the grooves or a region between adjacent grooves (land). In recent years, however, a land-groove recording system wherein both grooves and lands are used in the form of recording tracks has been proposed due to the need of achieving high-density recording by making the pitch of recording tracks narrow (JP-B 63-57859). In the present disclosure, it is noted that the term "groove" refers to a relatively concave area of a substrate having a recording layer formed thereon to allow recording and reading light to be incident on the recording layer through the substrate, i.e., an area located nearer to the side of the substrate on which light is incident, and the term "land" refers to a relatively convex area of the substrate, i.e., an area located farther off the side of the substrate on which light is incident.

However, the use of the land-groove recording system leads to a problem that it is difficult to obtain equivalent properties at the lands and grooves.

To solve this problem, for instance, JP-A 7-134838 proposes that while the groove has a specific depth at substantially the same groove and land width, the relation between the thickness of the second dielectric layer formed on the recording layer and the reflective layer formed on the second dielectric layer is specified, thereby making uniform the recording properties at the land and groove. However, this publication gives no example of the recording layer comprising an alloy other than the Ge-Sb-Te alloy.

A recording layer having an Ag-In-Sb-Te based composition containing Ag, In, Sb and Te as main components is characterized by being higher in sensitivity and clearer in the edges of recording marks than that based on a Ge-Sb-Te composition used in the example of the aforesaid JP-A 7-134838. Thus, this recording layer is suitable for mark edge recording. Mark edge recording enables information to be carried on both ends of recording edges, and so makes higher-density recording possible as compared with mark position recording where information is carried on the position of recording marks, resulting in recording capacity improvements.

As a result of examination of the land-groove recording properties of an optical recording medium using the aforesaid Ag-In-Sb-Te based recording layer, the inventors have now found that jitter and repetitive overwriting properties at the land are still unsatisfactory.

An object of the present invention is to provide a phase change type optical recording medium comprising a recording layer having an Ag-In-Sb-Te based composition and used in a land-groove recording mode, which has reduced land jitter while increased land jitter in association with repetition of overwriting is reduced.

SUMMARY OF THE INVENTION

Such an object is achieved by the inventions defined below as (1) to (3).

(1) An optical recording medium comprising a phase change type recording layer on a surface of a substrate with reading light incident on the recording layer through the substrate, and a dielectric layer provided in contact with the recording layer and on a side of the recording layer on which the reading light is incident, said substrate having a groove acting as a guide groove and a land between adjacent grooves so that the groove and land are used as recording tracks, wherein:

said phase change type recording layer contains Ag, In, Sb and Te as main components, said phase change type recording layer has a thickness $t_R$ defined by $t_R \leq \lambda_p/20$ where $\lambda_p$ is a wavelength of said reading light, and said dielectric layer has a thickness $t_{d1}$ that is represented in terms of an optical path length at said wavelength $\lambda_p$ and defined by $\lambda_p/2 \leq t_{d1}$.

(2) The optical recording medium of (1) above, wherein $\lambda_p/60 \leq t_R$.

(3) The optical recording medium of (1) above, which further comprises a reflective layer formed of a metal or a semi-metal, with said recording layer interleaved between said reflective layer and said dielectric layer.

BRIEF DESCRIPTION OF THE DRAWINGS

These and further features of the present invention will be apparent with reference to the following description and drawings, in which.

EMBODIMENTS OF THE INVENTION

Figure 1:
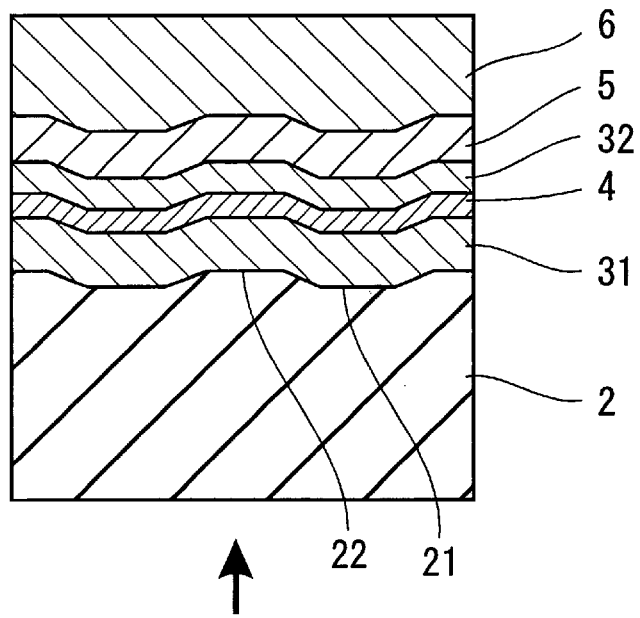
FIG. 1 is a fragmentary sectional schematic illustrative of one embodiment of the optical recording medium according to the present invention.

The present invention provides an optical recording medium that comprises a recording layer based on an Ag-In-Sb-Te composition and is used in the land-groove recording mode. In the present invention, the thickness $t_R$ of the recording layer should satisfy the following relation with respect to the wavelength $\lambda_p$ of reading light:

$$t_R \leq \lambda_p/20$$

and the thickness $t_{d1}$ of the dielectric layer located in contact with the side of the recording layer on which reading light is incident, as represented in terms of an optical path length at the wavelength $\lambda_p$, should satisfy the following relation:

$$\lambda_p/2 \leq t_{d1}$$

It is thus possible to reduce land jitter that increases when the Ag-In-Sb-Te based recording layer is used. It is also possible to reduce increased land jitter in association with repetition of overwriting. As a result, it is possible to reduce the difference in readout properties between grooves and lands and increase the number of the medium's overwritable cycles.

As already mentioned, the inventors' examination of the land-groove recording properties of the optical recording medium comprising an Ag-In-Sb-Te based recording layer indicates that land jitter properties, especially the repetitive overwriting properties at lands are still unsatisfactory. As a result of various experiments made to track down the cause, it has been found that when a medium the land jitter of which becomes worse after about 1,000 overwriting cycles is erased at lands with laser beam having an intensity (about 8 mW) close to the recording power level, land jitter improvements are achieved by repeating erasure about 100 or more times. It has also been found that when overwriting is carried out at a relatively low recording power level, increased jitter in association with the repetition of overwriting is somewhat reduced.

From these results, one of the causes for the increased land jitter in association with repetition of overwriting could be that recording marks remain unerased at both side ends of each land. This could in turn be due to the fact that the in-plane temperature profile of the recording layer on the lands becomes uneven upon recording light irradiation.

If the erasing power level is increased or the recording power level is decreased, it is then possible to prevent the recording marks from remaining unerased at the lands. In either case, however, the initial jitter becomes worse.

As a result of some considerable experiments made to achieve a medium optimized for the land-groove recording mode, the inventors have now found that if the dielectric layer present between the substrate and the recording layer is thicker than applied so far in the art and the thickness $t_R$ of the recording layer is relatively thin, it is then possible to reduce land jitter and increase the number of overwritable cycles. In other words, the inventors have found that if the thickness $t_{d1}$ of the dielectric layer and the thickness $t_R$ of the recording layer are within the ranges defined above, it is then possible to make the land properties obtained using an Ag-In-Sb-Te based recording layer equivalent to or higher than those obtained using a Ge-Sb-Te based recording layer, thereby taking full advantage of the Ag-In-Sb-Te based recording layer.

Some preferable embodiments of the present invention will now be explained at great length.

Figure 2:
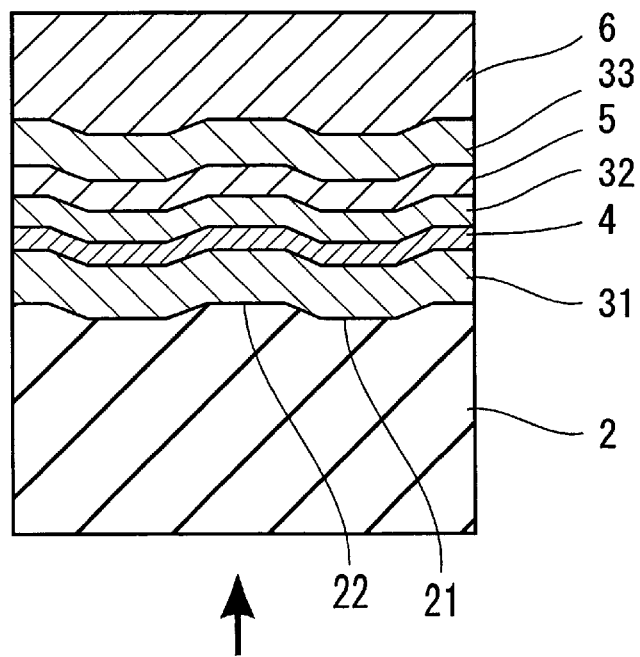
FIG. 2 is a fragmentary sectional schematic illustrative of another embodiment of the optical recording medium according to the present invention.

No particular limitation is imposed on the structure of the phase change type optical recording medium to which the present invention is applied. In other words, the present invention may be applied to a phase change type optical recording medium which comprises at least a substrate, a phase change type recording layer provided on the substrate, and a dielectric layer provided in contact with the side of the recording layer on which reading light is incident. However, the present invention should usually be applied to an arrangement wherein a first dielectric layer 31, a recording layer 4 and a second dielectric layer 32 are stacked on a substrate 2 in this order, with a reflective layer 5 provided on the second dielectric layer 32 if required, as shown in FIG. 1, or with a third dielectric layer 33 provided on the reflective layer 5 if required, as shown in FIG. 2. In the present disclosure, the medium of the arrangement shown in FIG. 1 is called a reflection type medium and the medium of the arrangement shown in FIG. 2 is referred to as an absorption coefficient control type medium. The present invention may also be applied to a double side recording type medium comprising two such single side recording type media which are bonded together at protective layers 6 through adhesive layers. Furthermore, the present invention may be applied to a medium wherein the aforesaid one side recording type medium is bonded to a protective substrate through an adhesive layer.

Then, the detailed arrangement of each part in the optical recording media shown in FIGS. 1 to 3 will be explained.
Substrate 2

In the optical recording medium of the invention, the recording layer 4 is irradiated through the substrate 2 with recording and reading light. It is therefore preferable that the substrate 2 is made up of a material substantially transparent to the recording and reading light used, for instance, a resin or glass material. For the resin, it is preferable to use acrylic resin, polycarbonate, epoxy resin, polyolefin or the like.

The substrate 2 has grooves 21 with a land 22 located between them. Both lands 22 and grooves 21 are used as recording tracks. The width of the groove may be equal to or different from the width of the land. In either case, the effect of the present invention is achievable. Usually, however, it is preferred that:

$$0.5 \leq 2W_G/(W_L+W_G) \leq 1.5$$

Here $W_G$ is the width of groove 21 and $W_L$ is the width of land 22. When the value of $2W_G/(W_L+W_G)$ is too small or too large, there is a large readout output difference between the land and the groove.

The depth of groove 21 has no particularly influence on the effect of the present invention, and so may be properly determined in such a way that sufficient tracking error signal output and readout signal output are obtained with suppressed crosstalk. Usually, however, it is preferred that:

$$\lambda_p/3n_S \leq d_G \leq \lambda_p/40n_S$$

Here $d_G$ is the depth of groove 21, and $n_S$ is the refractive index of substrate 2 at a recording and reading wavelength, and especially at a reading wavelength $\lambda_p$.

The thickness of substrate 2 is usually of the order of 0.2 to 1.2 mm. Too thick a substrate 2 results in a skew margin reduction whereas too thin a substrate 2 is susceptible to deformation, resulting in increased errors. The shape of the substrate is not particularly limited. Usually, however, the substrate has a disk form having a diameter of the order of 50 to 360 mm.

In the exemplary arrangements shown in FIGS. 1 and 2, a resin or glass plate having a thickness enough to be capable of maintaining shape without recourse to another backing member is used as substrate 2. However, it is understood that the present invention can be applied to an optical recording medium comprising a substrate that is much thinner than substrate 2 for the purpose of achieving higher recording densities. FIG. 3 shows one exemplary arrangement to this end.

Figure 3:
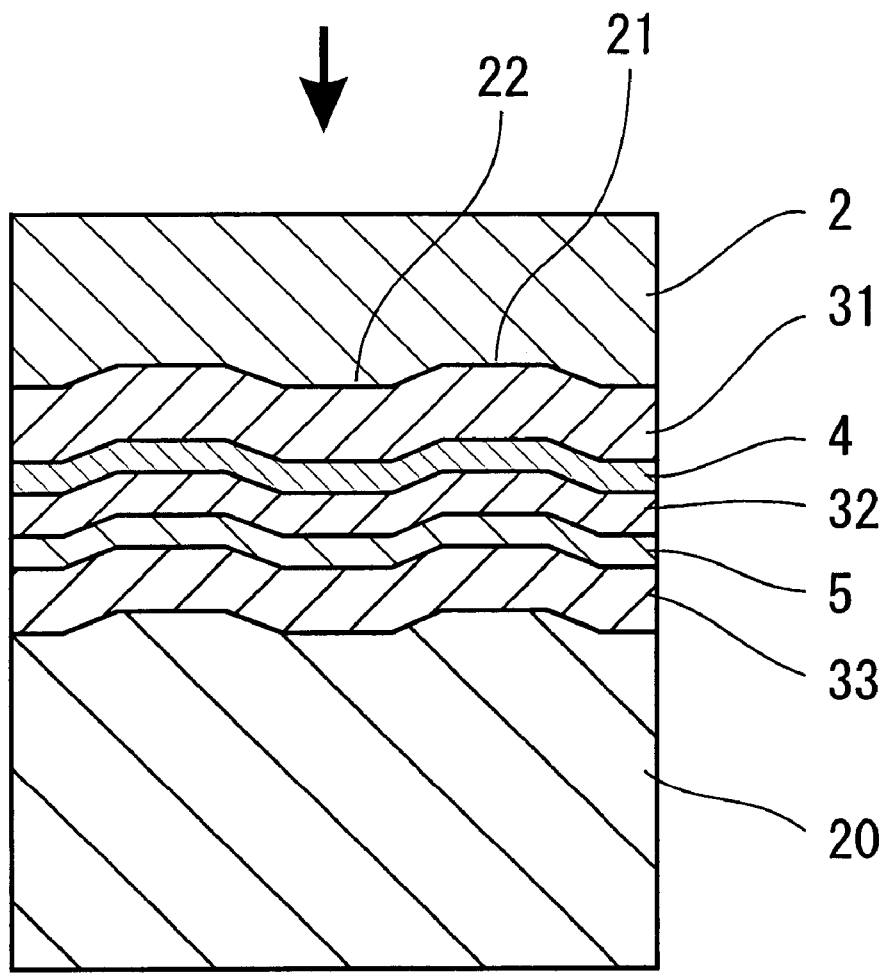
FIG. 3 is a fragmentary sectional schematic illustrative of yet another embodiment of the optical recording medium according to the present invention.

The optical recording medium shown in FIG. 3 is of a single side recording type wherein a third dielectric layer 33, a reflective layer 5, a second dielectric layer 32, a recording layer 4, a first dielectric layer 31 and a substrate 2 are stacked on a supporting substrate 20 in this order. That is, this medium has an absorption coefficient control structure as is the case with the medium shown in FIG. 2. The supporting substrate 20 of FIG. 3 is made up of a resin or glass plate having a thickness enough to maintain shape by itself, as in the case of the substrate 2 shown in FIG. 1. This medium, because of having an absorption coefficient control structure, should preferably be designed in such a way as to substantially prevent reflection of recording and reading light from the supporting substrate 20 toward the recording layer 4. It is thus preferable to make the supporting substrate 20 transparent to, or absorb, recording and reading light, or alternatively provide a light absorbing layer capable of absorbing recording and reading light between the supporting substrate 20 and the third dielectric layer 33. In the arrangement shown in FIG. 2, too, it is preferable to substantially prevent reflection of recording and reading light from a protective layer 6 toward the recording layer 4. It is thus preferable to make the protective layer 6 transparent to, or absorb, recording and reading light, or alternatively provide a light absorbing layer between the protective layer 6 and the third dielectric layer 33.

The stacking order of the third dielectric layer 33 to the first dielectric layer 31 on the supporting substrate 20 is the same as in FIG. 2, as viewed from the side of the medium on which recording and reading light is incident (the side of substrate 2).

The substrate 2 of FIG. 3 may be formed by applying a transparent resin sheet to the first dielectric layer 31 using an adhesive resin, applying a transparent resin sheet made up of an adhesive resin to the first dielectric layer 31, or curing or drying of a coating film of transparent resin. For the adhesive resin used herein, for instance, pressure-sensitive adhesives and ultraviolet or other energy beam-curing resins are used. Preferably but not exclusively, the transparent resin may be coated by a spin-coating process. The substrate 2 is as thin as it cannot maintain shape by itself. For instance, the thickness of substrate 2 is usually of the order of 0.05 to 0.3 mm although varying depending on what material it is formed of.

In the substrate 2 shown in FIG. 3, too, a region near to the side of the medium on which recording and reading light is incident defines a groove 21 and a region between adjacent grooves defines a land 22. An asperity pattern comprising lands 22 and grooves 21, which the substrate 2 has, may be formed by providing a similar asperity pattern on the surface of the supporting substrate 20, then stacking the dielectric layers, recording layer, etc. on the supporting substrate, and finally the substrate 2 on the dielectric layer 31 in such a manner as mentioned above. The surface of each of the thus stacked dielectric layers and recording layer is provided with asperities corresponding to the asperity pattern on the surface of the supporting substrate 20. If the transparent resin sheet to provide the substrate 2 is applied on the first dielectric layer 31, then the aforesaid asperities are transferred on the transparent resin sheet or the adhesive resin used for that application. When the substrate 2 is formed by resin coating, only resin coating is needed for the formation of grooves and lands.

In the reflection structure type medium shown in FIG. 1, too, such a thin substrate as shown in FIG. 3 may be used.

First Dielectric Layer 31 and Second Dielectric Layer 32

The first dielectric layer 31 is provided to prevent oxidation of the recording layer, and protect the substrate by cutting off heat that may otherwise be conducted from the recording layer to the substrate during recording. The second dielectric layer 32 is provided to protect the recording layer, and control a release of remnant heat from the recording layer after the completion of recording. Both the dielectric layers also contribute to an improvement in the degree of modulation.

Again let $t_{d1}$ denote the thickness of the dielectric layer that is located in contact with the recording layer and on the side of the recording layer on which reading light is incident, i.e., the first dielectric layer 31 shown in FIGS. 1 to 3, as represented by an optical path length at a wavelength $\lambda_p$ of reading light. In the present invention, the thickness $t_{d1}$ should be:

$$\lambda_p/2 \leq t_{d1}, \text{ and preferably } (3/4)\cdot\lambda_p \leq t_{d1}$$

When $t_{d1}$ is too small, jitter at the lands increases and the number of overwritable cycles at the lands decreases. As $t_{d1}$ increases, the reflectance of the medium undergoes a recurrence of periodical fluctuations. For this reason, no particular problem arises in terms of reflectance. However, productivity becomes worse. It is thus preferred that:

$$t_{d1} \leq \lambda_p$$

In the present invention, the lower limit is imposed on $t_{d1}$, making use of the wavelength $\lambda_p$ of reading light. The experiments conducted by the inventors teach that the present invention is particularly effective for cases where $\lambda_p$ is 680 nm or shorter. However, $\lambda_p$ is generally 350 nm or longer. It is common that the recording light wavelength is the same as the reading light wavelength. However, the present invention may also be applied to cases where the recording light wavelength is different from the reading light wavelength, for instance, a case where reading light is generated using a short-wavelength laser incapable of generating the power needed for recording. Even in this case, the effect of the present invention is achievable.

No particular limitation is placed on the arrangement of the first dielectric layer 31 except its thickness and the arrangement of the second dielectric layer 32; these may be determined in accordance with a conventional phase change type recording medium. For the dielectric layer-forming material, for instance, at least one compound may be selected from silicon oxide, zinc sulfide, germanium nitride, silicon nitride and rare earth oxides. The thickness of the second dielectric layer 32 may usually be selected from the range of 10 to 50 nm.

Recording Layer 4

Again let $t_R$ stand for the thickness of the recording layer and $\lambda_p$ represent the wavelength of reading light. It is then preferred that:

$$t_R \leq \lambda_p/20, \text{ and especially } t_R \leq \lambda_p/22$$

When $t_R$ is too large, the effect of the present invention is not achievable. It is noted that when the recording layer is too thin, the reflectance difference between the crystallographic state and the amorphous state decreases, and so no sufficient properties are obtained at both the lands and the grooves. It is thus preferred that:

$\lambda_p/60 \leq t_R$, and especially $\lambda_p/50 \leq t_R$

The recording layer is made up of a phase change type material. As already stated, the present invention is very effective for a phase change type of optical recording media having recording layers based on In-Ag-Te-Sb compositions.

In the present invention, the atomic ratio between elements constituting the recording layer based on the In-Ag-Te-Sb composition is determined as represented by formula I:

$$[(In_a Ag_b Te_{1-a-b})_{1-c} Sb_c]_{1-d} M_d \qquad (I)$$

Here it is preferable that
  a=0.1 to 0.3
  b=0.1 to 0.3
  c=0.5 to 0.8
  d=0 to 0.10
It is more preferable that
  a=0.11 to 0.28
  b=0.15 to 0.28
  c=0.55 to 0.78
  d=0.005 to 0.05

When the value of a in formula I is too small, the In content of the recording layer becomes relatively too small. This in turn makes the amorphism of recording marks insufficient, resulting in a drop of the degree of modulation, and a reliability drop as well. At too large a value of a, on the other hand, the In content of the recording layer becomes relatively too high. This in turn makes the reflectance of areas other than the recording marks low, resulting in a drop of the degree of modulation.

When the value of b in formula I is too small, the Ag content of the recording layer becomes relatively too low. This in turn makes the recrystallization of recording marks difficult and so renders repetitive overwriting difficult. At too large a value of b, on the other hand, the Ag content of the recording layer becomes relatively high, and so excessive Ag diffuses independently into an Sb phase at the time of recording or erasing. This in turn makes the robustness of the recording layer upon rewriting low, and renders the stability of both recording marks and crystalline portions low, resulting a reliability drop. In other words, the crystallization of the recording marks is promoted during storage at high temperatures, often resulting in drops of C/N and the degree of modulation. Repetition of recording may often facilitate deterioration in C/N and the degree of modulation.

When the value of a+b is too small, a Te phase is formed by excessive Te. The Te phase makes erasing difficult because it slows down the rate of crystal transition. When the value of a+b is too large, on the other hand, it is difficult to make the recording layer amorphous, leading to a possibility that signals may not be recorded.

When the value of c in formula I is too small, there is an increased reflectance difference concomitant with a phase change, but difficulty is involved in erasing because of an abrupt crystal transition rate drop. At too large a value of c, on the other hand, the degree of modulation becomes low due to a decreased reflectance difference incidental to the phase change.

In formula I, M represents at least one element selected from the group consisting of H, Si, C, V, W, Ta, Zn, Ti, Ce, Tb, Ge, Sn, Pb, and Y. The element M is effective for improving rewriting robustness, more specifically reducing the drop of erasability due to repetition of rewriting, and contributes to a reliability improvement under unfavorable conditions, e.g., high temperature and humidity conditions. Of these elements, it is preferable to use at least one of V, Ta, Ce, Ge and Y because their such effects are strong.

When the value of d representing the content of the element M is too large, no sufficient degree of modulation is obtainable because of a decreased reflectance difference concomitant with a phase change. When the value of d is too small, the effect of the element M added becomes slender.

It is preferred that the recording layer based on this composition consists essentially of Ag, Sb, Te and In, and the element or elements M added if required. In the practice of the present invention, however, it is acceptable that Ag may be partially replaced by Au, Sb may be partially replaced by Bi, Te may be partially replaced by Se, and In may be partially replaced by Al and/or P.

The percent replacement of Ag by Au is preferably up to 50 at %, and more preferably up to 20 at %. At too high a percent replacement, recording marks are susceptible to crystallization, leading to a reliability drop at high temperatures.

The percent replacement of Sb by Bi is preferably up to 50 at %, and more preferably up to 20 at %. Too high a percent replacement causes the recording layer to have an increased coefficient of absorption, resulting in a reduction of the interference effect of light. This in turn makes the reflectance difference between crystalline and amorphous portions and hence the degree of modulation low, so failing to obtain high C/N.

The percent replacement of Te by Se is preferably up to 50 at %, and more particularly up to 20 at %. Too high a percent replacement causes the rate of crystal transition to become too low to obtain any sufficient erasability.

The percent replacement of In by Al and/or P is preferably up to 40 at %, and more preferably up to 20 at %. Too high a percent replacement causes the stability of recording marks to become low with a reliability drop. It is to be noted that Al and P may be used at any desired proportion.

In connection with this composition system, it is to be noted that the absorption coefficient, k, of the recording layer after repeated rewriting is about 3.3 in a crystallographic state, and about 2.2 in a microcrystalline or amorphous state.

The composition of the recording layer may be measured by EPMA, X-ray microanalysis, ICP, or the like.

Preferably, the recording layer is formed by sputtering. Sputtering conditions are not critical to the practice of the present invention. For instance, an alloy target or a multi-target sputtering process with a plurality of targets may be used for the sputtering of a material comprising a plurality of elements.

Reflective Layer 5

In the reflection type structure shown in FIG. 1, the reflective layer 5 may be formed of a high-reflectance metal such as Al, Au, Ag and Pt or a high-reflectance alloy containing at least one of these metals.

In the absorption coefficient control structure shown in FIG. 2, on the other hand, the reflective layer 5 should be transparent to recording light and reading light. Why the absorption coefficient control structure is here selectively used will now be explained.

In a phase change type optical recording medium, the absorptance (Ac) of the recording layer at an area (in a crystalline state) other than a recording mark area is often different from the absorptance (Aa) of the recording layer at the recording mark area (in a non-crystalline state). In general, Ac<Aa. Here Ac and Aa are the values as measured at the wavelength of recording and reading laser beam. For this reason, recording sensitivity and the rate of erasure vary largely depending on whether the overwriting area was in the crystalline state or in the non-crystalline state. Consequently, there are variations in the length and width of recording marks formed by overwriting, which may otherwise result in increased jitter and, hence, errors. Especially when high recording density is achieved by mark edge recording wherein information is carried at both ends of a recording mark, there are even more errors under the possible influence of fluctuations in the length of the recording mark.

To solve this problem, it is required that Ac and Aa be preferably as close to each other as possible, more preferably Ac/Aa≧0.9, and even more preferably Ac/Aa≧1. More preferably, Ac/Aa≧1 when the influence of latent heat is taken into account. This may be achieved by controlling the thickness of the recording layer or the thicknesses of the dielectric layers between which the recording layer is interleaved. If Ac≧Aa is applied to a medium of ordinary structure, another problem then arises; C/N becomes low due to a small difference between the reflectance (Rc) of the medium at an area other than a recording mark area and the reflectance (Ra) of the medium at the recording mark area.

Situations being like this, for instance, JP-A 8-124218 has proposed an optical information recording medium comprising a substrate, and a first dielectric layer, a recording layer, a second dielectric layer, a reflective layer, a third dielectric layer and an ultraviolet-curing resin layer stacked thereon in the described order, wherein Ac>Aa, a transmitting superthin metal film or Si or Ge is used as the reflective layer, and a dielectric material having a refractive index of greater than 1.5 is used as the third dielectric layer. By providing the light transmitting reflective layer and the third dielectric layer having a high refractive index, it is thus possible to set the Ac/Aa ratio within the above range while large Rc-Ra is kept.

It is here noted that Ac and Aa may be calculated from the optical constant of each of the recording, dielectric, reflective and other layers and the wavelengths of recording laser beam and reading laser beam.

In the medium shown in FIG. 2, the reflective layer should be transparent to the recording and reading light. For instance, when the recording and reading wavelength is in the near infrared to infrared region, the reflective layer should be formed of a super-thin metal layer or a semi-metal such as Si or Ge. The thickness of the reflective layer may be properly determined in such a way that the absorption coefficient difference between an area of the recording layer other than recording marks and the recording mark can be controlled. The thickness of the reflective layer may also be properly determined depending on the material forming the reflective layer, because the preferable thickness of the reflective layer varies largely depending on that material. For instance, when a metal such as Au is used, the reflective layer should preferably have a thickness of 40 nm or less, and especially 10 to 30 nm, and when Si or Ge is used, the reflective layer should preferably have a thickness of 80 nm or less, and especially 30 to 70 m. Too thin a reflective layer gives rise to C/N drops whereas too thick a reflective layer makes the effect on correction of absorption coefficient insufficient. For the metal for the reflective layer, Au or an Au alloy is preferred. For the Au alloy, it is preferable to use an alloy composed mainly of Au and further containing at least one element selected from Al, Cr, Cu, Ge, Co, Ni, Mo, Ag, Pt, Pd, Ta, Ti, Bi and Sb.

Third Dielectric Layer 33

For the material forming the third dielectric layer, a suitable selection may be made for the dielectric materials explained in conjunction with the first and second dielectric layers.

Usually, the thickness of the third dielectric layer should preferably be selected from the range of 30 to 120 nm.

Protective layer 6

The protective layer is provided to improve scratch resistance and corrosion resistance. Preferably, this protective layer is made up of various organic materials. However, particular preference is given to constructing the protective layer of a radiation-curing type compound or a composition thereof, which is cured with radiation such as electron beams or ultraviolet rays. The protective layer has usually a thickness of about 0.1 to 100 $\mu$m, and may be formed by ordinary processes such as spin coating, gravure coating, spray coating, and dipping.

EXAMPLE

Example 1

Optical recording disk samples having the same arrangement as shown in FIG. 1 were prepared as follows.

Used for the substrate 2 was a disk form of polycarbonate of 120 mm in diameter and 0.6 mm in thickness, which was provided with grooves by injection molding. Land width $W_L$ and groove width $W_G$ were each 0.40 $\mu$m. Thus, $$2W_G/(W_L+W_G)=1.00$$

Groove depth was $\lambda_p/11n_S$. In this example, both reading light wavelength and recording light wavelength were $\lambda_p$=634 nm.

The first dielectric layer 31 was formed by a sputtering process in an Ar atmosphere, using ZnS (85 mol %)—SiO$_2$ (15 mol %) for a target. The thickness ($t_{d1}$) of the first dielectric layer as represented by an optical path length at the wavelength $\lambda_p$ is shown in Table 1. The refractive index of the first dielectric layer at the wavelength $\lambda_p$ was 2.2.

The recording layer 4 was formed by a sputtering process. The recording layer had a composition represented by formula I:

$$[(In_aAg_bTe_{1-a-b})_{1-c}Sb_c]_{1-d}Ge_d \qquad (I)$$

wherein a=0.11, b=0.16, c=0.64 and d=0.02. The thickness $t_R$ of the recording layer as normalized at the wavelength $\lambda_p$ is shown in Table 1.

The second dielectric layer 32 was prepared as in the case of the first dielectric layer with the exception that ZnS (50 mol %)-SiO$_2$ (50 mol %) was used for the target. The second dielectric layer had a thickness of 23 nm.

The reflective layer 5 was formed by a sputtering process in an Ar atmosphere. For the target, an Al-1.7 at % Cr alloy target was used. The thickness of the reflective layer was 100 nm.

The protective layer 6 was formed by the spin coating of an ultraviolet-curing resin, followed by curing the resin by ultraviolet irradiation. Upon curing, the protective layer had a thickness of 5 $\mu$m.

The recording layer of each of the thus prepared samples was initialized in a solid-phase state, using a bulk eraser. Then, 8–16 modulation signals were repeatedly overwritten on each sample placed on an optical recording medium estimator (a light source wavelength of 634 nm, a numerical aperture NA of 0.6 and a linear velocity of 3.5 m/s). After 10, and 1,000 overwriting cycles, clock jitter was found by measuring readout signals by means of a time interval analyzer, and substituting the measurement in $$\sigma/T(\%)$$

where T is the window width. The recording power and erasing power were set at a value where jitter was minimized. The results are shown in Table 1. When the clock jitter is 10% or less, no grave problem arises.

TABLE 1

$\lambda_p = 634$ nm

| Sample No. | $t_R$ | $t_{d1}$ | Land Jitter (%) after 10 | Land Jitter (%) after 1000 | Groove Jitter (%) after 10 | Groove Jitter (%) after 1000 |
|---|---|---|---|---|---|---|
| 101 | $\lambda_p/37$ | $\lambda_p/1.4$ | 8.6 | 9.2 | 8.3 | 9.0 |
| 102 | $\lambda_p/42$ | $\lambda_p/1.2$ | 7.0 | 8.8 | 7.8 | 8.4 |
| 103 (comp.) | $\lambda_p/18$* | $\lambda_p/1.4$ | 11.5* | 11.9* | 9.5 | 10.0 |
| 104 (comp.) | $\lambda_p/32$ | $\lambda_p/3.6$* | 11.3* | 14.0* | 8.8 | 9.2 |
| 105 (comp.) | $\lambda_p/18$* | $\lambda_p/3.6$* | — | — | 8.0 | 8.5 |

*indicates deviations from the defined or preferred range, and — shows that any measurement could not be obtained.

The advantages of the present invention are evident from Table 1. When $t_R$ and $t_{d1}$ are within the ranges defined herein, both land jitter and groove jitter are much the same level or within 10%. When either one of $t_R$ and $t_{d1}$ deviates from the range defined herein, land jitter exceeds 10%. For sample No. 105, land jitter was too large for measurement.

For the purpose of comparison, an optical recording disk sample was prepared as in sample No. 105 with the exception that the composition of the recording layer was changed to $Ge_2Sb_2Te_5$, and estimated as mentioned above. As a result, both land jitter and groove jitter were within 10% even after 1,000 overwriting cycles. From this result, it is evident that the present invention is effective for the Ag-In-Sb-Te based recording layer.

The samples shown in Table 2 were prepared following the samples shown in Table 1 with the exception that the thickness $t_R$ of the recording layer and the thickness $t_{d1}$ of the first dielectric layer were changed to the values shown in Table 2. Clock jitter was measured in the same manner as in Example 1 with the exception that the reading light wavelength $\lambda_p$ was changed to 430 nm while the recording light wavelength remained unchanged. The results are shown in Table 2.

TABLE 2

$\lambda_p = 430$ nm

| Sample No. | $t_R$ | $t_{d1}$ | Land Jitter (%) after 10 | Land Jitter (%) after 1000 | Groove Jitter (%) after 10 | Groove Jitter (%) after 1000 |
|---|---|---|---|---|---|---|
| 201 | $\lambda_p/37$ | $\lambda_p/1.4$ | 9.0 | 9.5 | 8.3 | 8.5 |
| 202 | $\lambda_p/42$ | $\lambda_p/1.2$ | 8.8 | 9.2 | 8.0 | 8.7 |
| 203 (comp.) | $\lambda_p/18$* | $\lambda_p/1.4$ | 9.8 | 11.0* | 8.6 | 9.2 |
| 204 (comp.) | $\lambda_p/18$* | $\lambda_p/3.6$* | — | — | 8.7 | 9.7 |

*indicates deviations from the defined or preferred range, and — shows that any measurement could not be obtained.

From Table 2, it is found that even when the reading light wavelength is different from the recording light wavelength, the advantages of the present invention are achievable.

Example 3

The samples shown in Table 3 were prepared as in the case of those shown in Table 1 with the exception that the thickness $t_R$ of the recording layer and the thickness $t_{d1}$ of the first dielectric layer were changed to the values shown in Table 3. These samples were measured for clock jitter as in Example 1 with the exception that both recording light wavelength and reading light wavelength $\lambda_p$ were changed to 409 nm. The results are shown in Table 3.

These samples have generally large clock jitter because various conditions such as the thermal conductivity of the reflective layer are not optimized for short-wavelength recording and reading light. In Table 3, therefore, the preferable range of clock jitter is 13% or less.

TABLE 3

$\lambda_p = 409$ nm

| Sample No. | $t_R$ | $t_{d1}$ | Land Jitter (%) after 10 | Land Jitter (%) after 1000 | Groove Jitter (%) after 10 | Groove Jitter (%) after 1000 |
|---|---|---|---|---|---|---|
| 301 (comp.) | $\lambda_p/27.3$ | $\lambda_p/2.2$* | — | — | 13.7* | 17.7* |
| 302 (comp.) | $\lambda_p/17.8$* | $\lambda_p/2.2$* | — | — | 14.7* | 15.5* |
| 303 | $\lambda_p/27.3$ | $\lambda_p/1.3$ | 12.0 | 12.5 | 9.8 | 10.8 |
| 304 (comp.) | $\lambda_p/17.8$* | $\lambda_p/1.3$ | 20.5* | 20.6* | 12.0 | 12.8 |
| 305 | $\lambda_p/27.3$ | $\lambda_p/0.8$ | 12.7 | 12.9 | 10.0 | 10.1 |
| 306 (comp.) | $\lambda_p/17.8$* | $\lambda_p/0.8$ | 17.0* | 17.1* | 10.9 | 11.3 |

*indicates deviations from the defined or preferred range, and — shows that any measurement could not be obtained.

From Table 3, it is found that the effect of the present invention is achievable even when both recording light and reading light have short wavelengths.

Example 4

Optical recording disk samples having the same structure as shown in FIG. 3 with the exception that the third dielectric layer 33 was removed therefrom were prepared as follows.

Used for the supporting substrate 20 was a disk form of polycarbonate of 120 mm in diameter and 1.2 mm in thickness, which was provided with grooves by injection molding. Land width $W_L$ and groove width $W_G$ were each 0.40 µm. Groove depth was $\lambda_p/6.5n_S$.

The reflective layer 5 was formed by a sputtering process in an Ar atmosphere, using an $Ag_{97.3}Pd_{1.0}Cu_{1.7}$ alloy target, and had a thickness of 100 nm.

Then, the second dielectric layer 32, recording layer 4 and first dielectric layer 31 were formed on the reflective layer 5 as in Example 1. The thickness $t_{d1}$ of the first dielectric layer and the thickness $t_R$ of the recording layer are shown in Table 4.

Finally, a polycarbonate sheet of 0.6 mm in thickness was applied on the first dielectric layer using an adhesive sheet comprising a pressure-sensitive adhesive agent to obtain the substrate 2.

These samples were measured for clock jitter as in Example 4. The results are shown in Table 4.

In Table 4, too, the preferable range of clock jitter is 13% or less.

TABLE 4

| | | | Land Jitter (%) | | Groove Jitter (%) | |
|---|---|---|---|---|---|---|
| Sample No. | $t_R$ | $t_{d1}$ | after 10 | after 1000 | after 10 | after 1000 |
| 401 (comp.) | $\lambda_p/27.3$ | $\lambda_p/2.2$* | — | — | — | — |
| 402 (comp.) | $\lambda_p/17.8$* | $\lambda_p/2.2$* | — | — | — | — |
| 403 | $\lambda_p/27.3$ | $\lambda_p/1.3$ | 12.0 | 12.0 | 7.6 | 12.8 |
| 404 (comp.) | $\lambda_p/17.8$* | $\lambda_p/1.3$ | 13.8* | 15.8* | — | — |
| 405 | $\lambda_p/27.3$ | $\lambda_p/0.8$ | 11.0 | 11.9 | 7.4 | 12.7 |
| 406 (comp.) | $\lambda_p/17.8$* | $\lambda_p/0.8$ | — | — | 13.0 | 14.5* |

*indicates deviations from the defined or preferred range, and — shows that any measurement could not be obtained.

From Table 4, it is found that the effect of the present invention is achievable irrespective of the structure of the medium.

Japanese Patent Application No. 11-76943 is herein incorporated by reference.

Although some preferred embodiments have been described, many modifications and variations may be made thereto in the light of the above teachings. It is therefore to be understood that within the scope of the appended claims, the invention may be practiced otherwise than as specifically described.

What we claim is:

1. An optical recording medium comprising a phase change type recording layer on a surface of a substrate with reading light incident on the recording layer through the substrate, and a dielectric layer provided in contact with the recording layer and on a side of the recording layer on which the reading light is incident, said substrate having a groove acting as a guide groove and a land between adjacent grooves so that the groove and land are used as recording tracks, wherein:

said phase change type recording layer contains Ag, In, Sb and Te as main components, said phase change type recording layer has a thickness $t_R$ defined by $t_R \leq \lambda_p/20$ where $\lambda_p$ is a wavelength of said reading light, and said dielectric layer has a thickness $t_{d1}$ that is represented in terms of an optical path length at said wavelength $\lambda_p$ and defined by $\lambda_p/2 \leq t_{d1}$.

2. The optical recording medium of claim 1, wherein $\lambda_p/60 \leq t_R$.

3. The optical recording medium of claim 1, which further comprises a reflective layer formed of a metal or a semi-metal, with said recording layer interleaved between said reflective layer and said dielectric layer.

* * * * *